(12) United States Patent
Barowski et al.

(10) Patent No.: US 7,849,428 B2
(45) Date of Patent: Dec. 7, 2010

(54) FORMALLY DERIVING A MINIMAL CLOCK-GATING SCHEME

(75) Inventors: Harry Barowski, Boeblingen (DE); J. Adam Butts, Hartsdale, NY (US); Tobias Gemmeke, Stutensee (DE); Nicolas Maeding, Holzgerlingen (DE); Viresh Paruthi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 12/107,940

(22) Filed: Apr. 23, 2008

(65) Prior Publication Data
US 2008/0288901 A1    Nov. 20, 2008

(30) Foreign Application Priority Data
Apr. 23, 2007    (EP) .................. 07106679

(51) Int. Cl.
*G06F 17/50*    (2006.01)
(52) U.S. Cl. .............................. 716/5; 716/1
(58) Field of Classification Search .......... 716/1, 716/5
See application file for complete search history.

(56) References Cited

U.S. PATENT DOCUMENTS

| 6,763,505 | B2 * | 7/2004 | Baumgartner et al. | 716/5 |
| 7,254,793 | B2 * | 8/2007 | Chen et al. | 716/5 |
| 2003/0192018 | A1 * | 10/2003 | Baumgartner et al. | 716/5 |
| 2006/0190870 | A1 * | 8/2006 | Chen et al. | 716/5 |
| 2007/0226664 | A1 * | 9/2007 | Gemmeke et al. | 716/5 |
| 2008/0028347 | A1 * | 1/2008 | Hiraoglu et al. | 716/5 |
| 2009/0293028 | A1 * | 11/2009 | Hiraoglu et al. | 716/5 |

* cited by examiner

*Primary Examiner*—Jack Chiang
*Assistant Examiner*—Suchin Parihar
(74) *Attorney, Agent, or Firm*—Cantor Colburn LLP; John Campbell

(57) ABSTRACT

The present invention provides a fully automatic method for obtaining a circuit having minimized power consumption due to clock-gating. A circuit design to be optimized is modified to a reduced power modified design and associated with a clock gating scheme. Verification tools compare the modified design with the original design to a predetermined trigger-events to determine if the modified design can be used. Further modifications may be made iteratively until an optimal design is achieved.

20 Claims, 7 Drawing Sheets

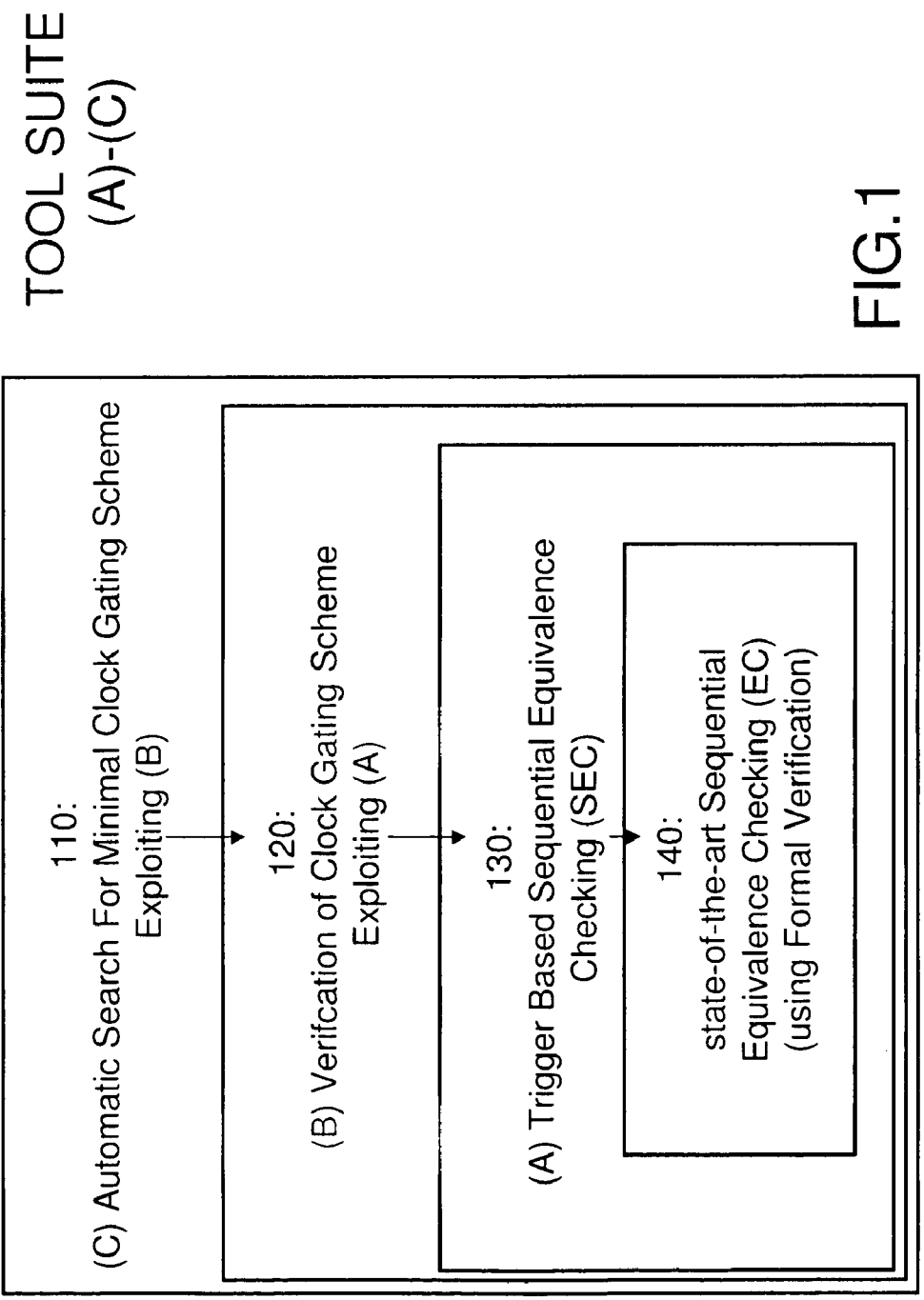

210: Tool A: (i) detection of trigger event

220: Tool A: (ii) trace cycle count relative to trigger event

230: Tool B: (iii) flip inputs to specific register(s) in specified cycle of a design A, and store as modified design A*

240: Tool A: (iv) prove equivalence of A and A* for all relevant outputs with respect to the latency measured relative to the trigger event.

250: Tool B: (v) verification of internal states that do not impact logical function, such as clock-gating signals

FIG.2

(A) (iii) force clock gating signal in cycle n to m as specified in configuration file(s)

inverting input using vhdl and net names of original vhdl.

```
...
instr_z_in <= xor(cg, instr_in);
...
```

| e.g.<br>-- register | width | activation |
|---|---|---|
| R1 | 32 | 0 0 1 0 |
| R2 | - | 0 1 0 0 |
| R3 | - | 0 1 0 0 |
| R4 | 2 | 1 0 0 0 |
| R5 | 32 | 0 1 0 0 |
| R6 | 32 | 0 1 0 0 |
| R7 | 32 | 0 1 0 0 |

FIG.5

610: SEARCH

710: for all instructions (as block or individually)

720: for each register

730: flip input of *register* in all cycles
740: equiv_check all *outputs* at *latency(output)*
  if all outputs "*correct*"
    *cg(register)* = 100%
    next register
760: else
    "*active*" *outputs* = *outputs* that are not "*correct*"
770: for *n*: 0,1,... until max(*latency(output)*)

775: flip input of *register* in all cycles but cycle *n*
780: equiv_check all "*active*" outputs at *latency(output)*
785: if all output active AND "*correct*"
    register non-cg in cycle *n*
    next register
790: if *n* > max(*latency(output)*)
795: "failed to find single non-cg cycle"

FIG.7

FORMALLY DERIVING A MINIMAL CLOCK-GATING SCHEME

BACKGROUND OF THE INVENTION

1. Field of the Invention

The present invention relates to the field of digital circuits, and in particular to the area of energy consumption required by clock-gating.

2. Background

Complicated digital circuits typically comprise millions of transistors. Circuit designers typically utilize computer-added design programs to aid their design process. Once a designer has finished the conceptual design of a circuit, there are many optimizations which can be made.

For example, energy consumption of the digital circuit has become one of the critical factors in digital systems, because of the requirement to dissipate this energy in high-density circuits and to extend the battery life in portable systems such as devices with wireless communication capabilities. It is known in prior art that the clock circuitries are one of the most energy-consuming components in a digital circuit.

In "IEEE transactions on circuits and systems—II: Analog and digital signal processing, vol. 44, nr. 6, June 1997, page 507 to 516, "Individual flip-flops with gated clocks for low power data pasts", Thomas Lang et al., a method for redesigning a digital circuit under the aspect of power saving is published, which discloses some techniques to reduce energy consumption by individually deactivating the clock, when flip-flops do not have to change their value. For selected digital circuits, such as a carry-save adder and an accumulator circuit, some improved flip-flop structures are proposed which were evaluated using energy models and which were validated by switch-level simulations.

Although significant energy reductions can be achieved by this prior art method for the selected circuit designs, this method cannot be used for any other circuits selected arbitrarily according to the actual need of a circuit designer, as the published method is only applicable for the concrete exemplary circuits described therein.

A second disadvantage is that the published method does not work fully automatically. So, a circuit designer is still required to have detailed knowledge of the circuit design, before he may apply the prior art method, or even apply only some general idea derivable from it.

SUMMARY OF THE INVENTION

It is thus the objective of the present invention to provide a method for implementing an improved clock-gating scheme for building a digital integrated circuit chip, which requires less work of highly-skilled design engineers and which finds an improved circuit design with a respectively reduced clock-gated energy consumption.

SUMMARY OF THE INVENTION

This objective of the invention is achieved by the features stated in enclosed independent claims. Further advantageous arrangements and embodiments of the invention are set forth in the respective claims.

Preferably, the present invention provides a fully automatic method for searching a circuit's realization with a clock-gating scheme which can be reasonably assumed to have minimized power consumption due to clock-gating, wherein the search is done dependent of certain constraints implied by the circuit design by means of formal verification methods.

Herein, the formal verification is done only to certain, predetermined times, which are defined in advance via so-called trigger-events.

After having defined these trigger-events for the circuit design under optimization, according to the invention, the design is automatically modified according to specific, newly generated changes of the clock control logic of the circuit. This may be done preferably in a hardware description language like VHDL, VDL or a netlist. The modified design is thus associated with a respective modified clock-gating scheme.

Then the modified design is compared to the original design by means of formal verification methods as known in the art, wherein the comparison is done only to that reduced subset of times which are defined by the before mentioned trigger-events. The modified circuit design is associated with a modified clock-gating scheme having less power consumption than the respective one of the original design. The idea is now to verify the new design against the original one. If it is functionally equivalent, a design is found which has a better clock-gating scheme and thus less power consumption.

This method is iterated with further, respective modified circuit designs fully automatically and the method is finished, when the circuit design is found which has the clock-gating scheme of minimal clock activity.

A method for implementing an improved clock gating scheme for at least one predefined section of logic comprised of an integrated circuit design A, wherein the circuit design is based on a predetermined reference clock gating scheme for the section of logic, wherein the method is characterised by the steps of:

a) defining a trigger event for at least one predefined section of logic comprised of the design A, which trigger event defines a cycle (best cycle 0), in which valid input data arrive at the logic section's input, e.g., the input register, b) determining a latency time describing a propagation delay time for signal propagation between the input of the logic section and preferably each output thereof, —which is done preferably by defining a number of n cycles after cycle 0, c) deriving a new clock gating scheme for the logical circuit section, which has a reduced number of clock activations for a predefined set of latches comprised of the circuit section, resulting in a respectively modified circuit design A*, d) calculating relevant equivalence checking time points by adding the latency time to a time corresponding to the trigger event, e) performing a formal verification based, sequential equivalence check of the outputs of designs A and A* only at the relevant time points, f) if equivalent, defining the design A*, which is associated with a better clocking gating scheme than that one of design A, as new reference design, g) repeating steps c) to e) until a predefined loop exit criterion is evaluated to TRUE.

A trigger event is defined herein by a specific transition of signals that trigger the processing in the first stage of a pipeline within the logic or logic section, where in the extreme case the pipeline may consist of a single delay stage, only.

The source of these signals can either be internal registers or external control inputs. These internal registers can, for example, hold an internal state of a state machine, or delayed control signals, or even data. External control inputs can, for example, be actual data inputs to the unit or control signals as, for example, the bits of an instruction opcode.

The circuit designs, which are subject to the inventive optimization procedure, are optimized on a single latch basis. In prior art, such optimization could only be done on so-called clock domains comprising multiple if not all latches of a circuit. This invention opens up the possibility to identify a larger plurality of new fine grain clock domains.

Further, no specific knowledge on details of the circuit design is necessary to apply the inventive method.

As the inventive method is at least in its major parts performed fully automatically without any interference of a circuit designer, circuit design optimization is performed by far more efficiently.

According to a separate preferred aspect of the present invention the inventive method is structured by applying a tool suite, wherein the tools invoke each other during the run of the inventive method. Herein, those tools are referred preferably as follows:

Tool A:

Trigger based sequential equivalence checking, further abbreviated also as SEC.

Tool B:

Verification of a clock-gating scheme under usage and exploitation of the results of tool A; and Tool C:

Automatic search for minimal clock-gating scheme under usage of and exploiting the results of tool B.

In tool C, certain registers are deactivated in the purpose of saving power. If the result at the output of the circuit is the same as, or equivalent to, that one stored for the original reference design, then the clock gating scheme may be better than the original one. Of course, this needs not to be proved for all input settings of the circuit domain under clock gating optimization processing. Selected ones do suffice. The deactivation of the register(s) is implemented by a respective modification of the clock gating scheme.

It is further proposed to add an additional XOR-gate in the data input of a latch as shown and described with reference to FIG. 4. An advantage of the addition is that no change of any clock-related circuitry is required.

BRIEF DESCRIPTION OF THE DRAWINGS

The present invention is illustrated by way of example and is not limited by the shape of the FIGS. of the drawings in which:

FIG. 1 illustrates the basic control flow of the inventive method according to a preferred embodiment thereof, in which a tool suite, i.e. three tools A, B and C are run and invoke each other;

FIG. 2 is a control flow diagram, which references the tools of FIG. 1 and shows the basic steps performed during the inventive method according to a preferred embodiment thereof;

FIG. 5 shows a clock-gating table, which is used during verification of the modified clock-gating scheme;

FIG. 7 is a more detailed schematic diagram illustrating a basic description of one search algorithm used in a preferred embodiment of the inventive method.

DETAILED DESCRIPTION OF THE INVENTION

Figure 3:
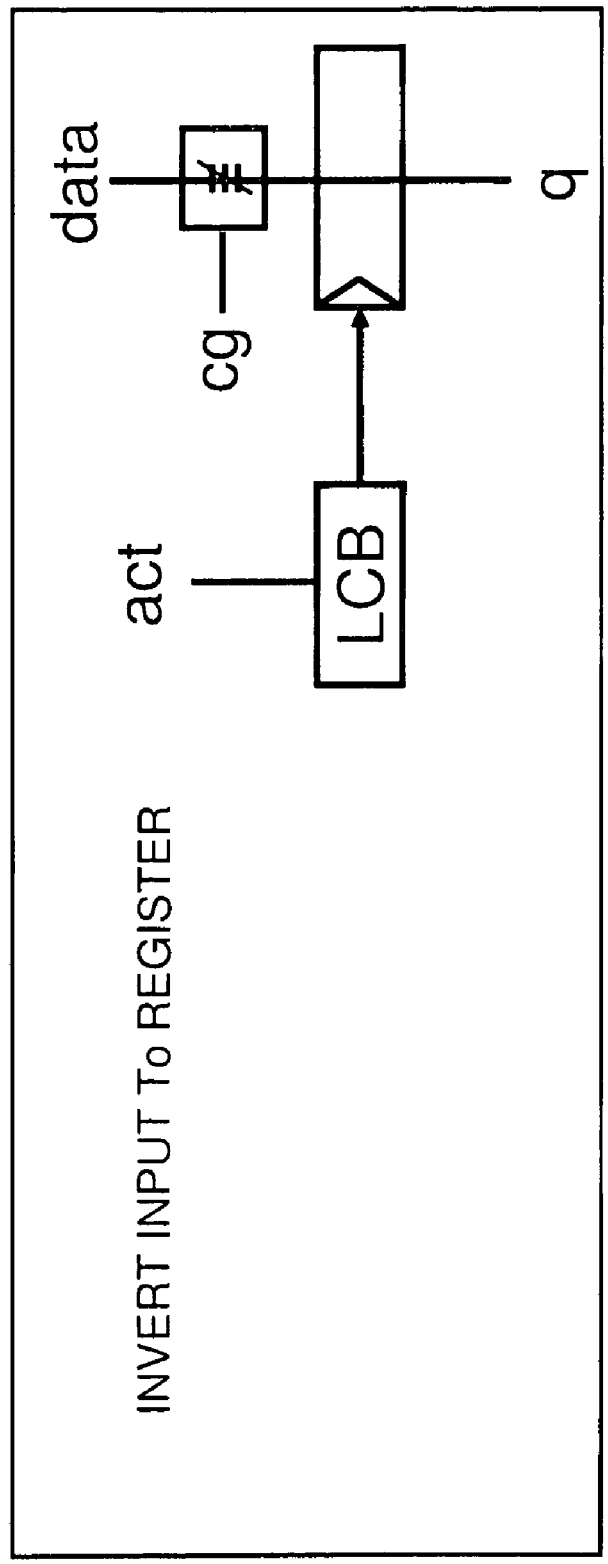
FIG. 3 illustrates in a simplified circuit diagram a preferred implementation of step iii) in FIG. 2, to force the clock-gating signal by inverting the input to a register.

With reference to FIG. 1 a preferred embodiment of the inventive method is described in more detail. According to the core idea of the present invention in this preferred method, formal verification is combined with a full, automatic search algorithm, preferably both acting on a predefined clock-gating domain. A person skilled in the art will predefine this clock-gating domain in a preparative step if required. For this circuit domain the inputs and the outputs must be determined in order to be able to trace them later on during the inventive method.

According to this embodiment the inventive search algorithm in FIG. 7 is implemented in a tool referred to herein as tool 110 (C). As a first basic action tool C invokes a tool B which implements the verification of a new clock-gating scheme in relation to the original, referenced clock-gating scheme after it has been created.

According to this preferred embodiment clock-gating is activated only for specific moments in time, i.e, clock cycles, for a given circuit domain, wherein those moments in time are calculated by tool A which is invoked by tool B. The primary work of tool B is to verify the functional equivalence of a current design against the original design without the clock-gating activation. The key idea behind that is to conditionally flip the inputs of any latch (flip-flop) under consideration for being clock-gated instead of actually forcing the clock signal.

Tool B invokes tool A, which in turn performs a special, inventive, sequential equivalence checking (SEC) which is trigger-based, and which processes the latency between input and output port of the circuit domain under optimization. The trigger event is defined in view of the problem that equivalence of the outputs is no longer given for all points in time if the clock-gating is changed, instead, only when output data is valid. In more detail the equivalence check of any two corresponding outputs is performed relative to this trigger event, wherein the relative number of cycles is the time distance based for the trigger event and is defined by the latency of the output with respect to the trigger event. It should be noted that the circuit designs, which are subjected to the functional equivalence check, only differ in that they have different clock-gating schemes.

Referring to FIG. 1, Tool A 130 invokes a state of the art tool 140, which performs the sequential equivalence checking using formal verification only to the subset of times defined by tool A. Tool 140 returns its result to tool A which in turn returns its result to tool B. Tool B in turn returns its result to tool C, which performs an outer loop in which iterations of generating further suitable clock-gating schemes are performed and which controls the point in time at which the iteration is stopped due to a sufficiently reduced clock activity thus, power saving clock-gating. Thus, a person skilled in the art may appreciate that this method applies functional verification and performs equivalence checking for a circuit design or a part of it in order to determine a minimal clock activation pattern that preserves the functionality desired for this circuit.

It should be further noted that a sequential equivalence check is required in this case in contrast to a combinatorial equivalence check because the application of clock-gating does change the contents of latches with respect to the reference design. Hence, the circuits are no longer combinatorial equivalent.

With respect to a separate, characteristic feature of this preferred embodiment the Sequencial Equivalancy Check (SEC) is performed under inclusion of a trigger event which defines the point in time when valid data occurs at the input of the logic circuit under optimization, and under inclusion of the latency time required for the signal propagating through the logic to produce the results thereof at its output register. Further details are given below and with reference to FIGS. 2, 3 and 4.

According to FIG. 2 the equivalence checking engine, implemented by tool (A) 130 and including state of the art SEC comprises the following further steps:

A step 210 which detects a trigger event, a further step 220 which traces the cycle count relative to this trigger event, a further step 230 which flips the inputs to specific registers in a respective, predetermined cycle of the referenced circuit design, denoted here as A, and to store this as a modified design A*. If the inverted signal does not impact equivalence of the circuits A and A* the corresponding latch does not need to be checked as the results are identical for both Boolean values stored in the latch at the specific moment in time. Behind this step lies the motivation to conditionally flip the inputs of the latch under consideration for being clock-gated, instead of actually overwriting and thus forcing the clock signal. Forcing the clock signals would disadvantageously require adaptation for the specifics of any latch realization. However, this approach only holds in general, if single latch bit flipping is considered during equivalence checking. In the case of XOR trees, multiple bit checking needs to apply explicit signal override or randomization of latch input or contents, respectively.

In a next step 240 the functional equivalence between circuit design A and A* is checked for all relevant output bits of the circuit design with respect to the latency measured before relative to the trigger event. This proof of equivalence has to be limited to these predefined points in time as for other points in time the equivalence is not required and potentially not given, when applying different clock activation schemes.

In a next step 250 internal states of the circuit design are verified that do not impact the logical function thereof. These internal states belong for example to clock-gating signals.

Next, various implementations for the before described steps 210 to 250 are described in more detail.

A possible implementation of the detection of the trigger event step 210 is a description in a hardware description language (HDL) of the trigger event, wherein for an incoming instruction in its specific register the bits of the operation code (Opcode) of the instruction are evaluated. The arrival of a valid instruction can then be determined when the respective Opcode bits are evaluated to be "1", for example. An example of a trigger event is as follows:

example of trigger event:

valid<=instr_raw and eq(instr, "11");

This and the following implementation examples are applicable for example in a prior art formal verification tool, in which the code shown here can be entered in a so-called "side VHDL", which has the advantage that the original VHDL (Very High Speed Integrated Circuit Hardware Description Language) specification is not modified.

A realization of step 220 to trace the cycle count relative to the trigger event is, when delay stages are implemented in HDL that delay the trigger event, such as:

instr_running(0)<=valid;
    instr_running(1)<=Latch(instr_running(0), 1);
    instr_running(2)<=Latch(instr_running(1), 1);
    instr_running(3)<=Latch(instr_running(2), 1);

A preferred implementation of step 230 is to force the clock-gating signal in cycle n to cycle m as it is specified in a respective configuration file:

cg<=nor(instr_running(n to m));

wherein the cg signal is used to impose clock gating.

A possible realization of step 230 is the addition of an XOR gate in the design A in front of the latch under consideration wherein one input is the original data input to the latch and the other input is the trigger event delayed by the number of cycles required by the before-mentioned search algorithm.

In a further implementation of this step 230 instead of adding the XOR to the design A* the corresponding net in A* can be split into two halves—one generating a new output and the other one a new input to the design A*. The new inputs and new outputs of A* are connected using an XOR gate and the delayed trigger event as described before. The corresponding circuitry is part of the shell instantiated by the equivalence checker engine.

Figure 4:
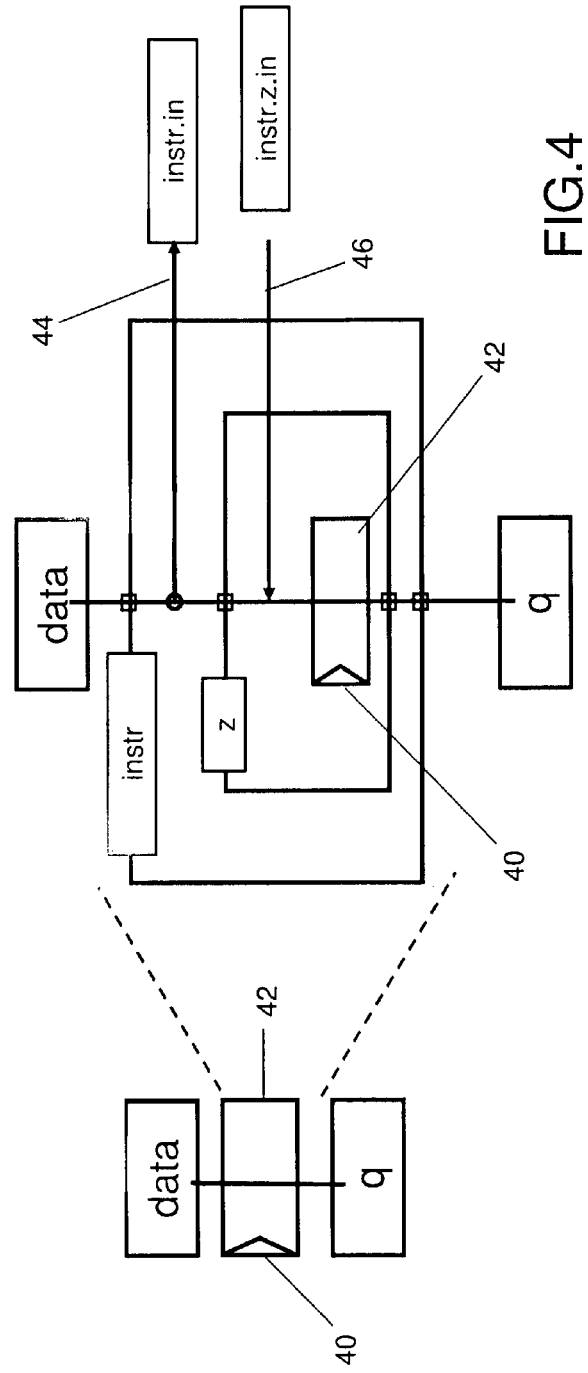
FIG. 4 illustrates in a schematic netlist representation means to force a signal as described in FIG. 3 without modification of the reference description of the circuit in exploiting hierarchical net names.

A preferred implementation of this step 230, however, is to invert the input of the latch as depicted in FIG. 3 using VHDL and net names of the original VHDL, as it is illustrated in FIG. 4.

The addition of the XOR gate in the netlist can be done by specifying the before mentioned side VHDL specifying new input and output signals and the new logic. Then, the formal verification tool reads internal signal, feeds in logic and overwrites the old internal signal with the new external source signal.

The first alternative for implementing this is to manipulate the clock signals going to the latch under consideration. A second alternative is a feedback loop which is added to realize a functional feedback. The preferred alternative is to invert the input to the latch. Each of these methods has to be applied during specific cycles under consideration for clock-gating. The first method needs consideration of the actual prevailing a realization of the register because the actual clock signals vary dependent on the register type in use.

The second method requires an additional multiplexer and a feedback loop. Further, in both methods the register contents are randomly initialized during verification. This is done because an initial value stored in the register before clock-gating is applied might by chance be the right value required for the corresponding operation. However, as this initial value is not assured, randomization is required. The table of FIG. 5 holds the names of the different registers in one column, it shows the respective bit width and in the column denoted "activation" the cycles, in which a respective register is activated, the respective column holds a 1, otherwise a 0.

FIG. 4 serves to illustrate this procedure. In the left area of the drawing an overview sketch is given which shows that an additional XOR-gate 40 is provided in the data input of the latch 42. From that the advantage results that no change of any clock-related circuitry is required. It simply exploits the fact that a specific bit has no influence on the subsequent logic, if it can be stored in any polarity. The conclusion thereof is then that the latch does not need to be clocked in that specific cycle to store any specific value.

In FIG. 4 the data input is at the top, and the output is at the bottom of the register. The XOR gate is directly in front of the register 42. The FIG. 4 shows that in order to avoid manipulation of the original HDL source code, the XOR gate 40 can be realized within a side HDL. Thus a kind of wrapper is provided which does not change the original VHDL.

As to the right side of FIG. 4, typical formal verification tools allow reading and overwriting signals within the design under test. To avoid a read and write conflict of the very same signal the data written to the latch is read (see arrow 44) from a higher hierarchy than its inverted value (see arrow 46) that is actually forcing the latch input. Such hierarchy can be easily introduced in the HDL if not present and required.

Next, the steps to set-up and run formal verification (see also step 240 in FIG. 2) to actually verify a new clock gating scheme are described in more detail.

For this set-up various inputs are required such as the hierarchical name of the registers that will be clock gated in the specific cycle, measured with respect to a trigger event, in which clock gating shall be applied.

A preferred embodiment of such input description is in form of a clock gating table as shown in FIG. 5.

Additionally, it is necessary to specify all relevant outputs together with their latency, which again is measured with respect to the very same trigger event. Also the logic needs to be specified, that defines this trigger event. These inputs are combined to set-up a side hdl that detects the trigger event, counts the cycles after each trigger event, and applies the clock gating as specified.

Then, the formal verification (FV) can be started. When the FV run has completed, its output will be analyzed telling whether any of the relevant outputs has failed, or not. These results are summarized and formatted for further processing.

An example for a HDL code implementation suitable for a FV tool to disable or enable a signal to be evaluated only after the predetermined delay after a predetermined trigger event is given next below with x being equal to the latency as specified in one or more configuration file(s):

disable_res<=not instr_running(x);

A skilled reader appreciates that this is the same as Tool B 230 (step iii), above, but the result output is ANDed with the disable_res signal. This way results in that both macros are forced to "0".

A realization of the step (iv) 240 in FIG. 2 (equivalence check) includes a gating of the output comparators under consideration. More particularly, the XOR of the corresponding outputs in A and A* is ANDed with a signal that is "1" n cycles after the trigger event, where "n" is equal to the latency. The units are then verified by a standard formal equivalence verification tool (e.g. the IBM internal tool "sixth sense", see R. M. Gott et al "Functional formal verification on designs of pSeries microprocessors and communication subsystems", IBM J. Res. & Dev., Vol. 49, No. 4/5, July/September 2005).

Clock gating patterns can be tested with formal verification as described above to verify if a specific clock gating pattern can be applied. With an appropriate permutation algorithm various clock gating tables can be tested to find an optimal clock gating scheme. For this purpose a search algorithm is defined. Whereas a full search takes far too long the following algorithm described below with reference to FIGS. 6 and 7 allows to quickly find a reasonable solution.

Figure 6:
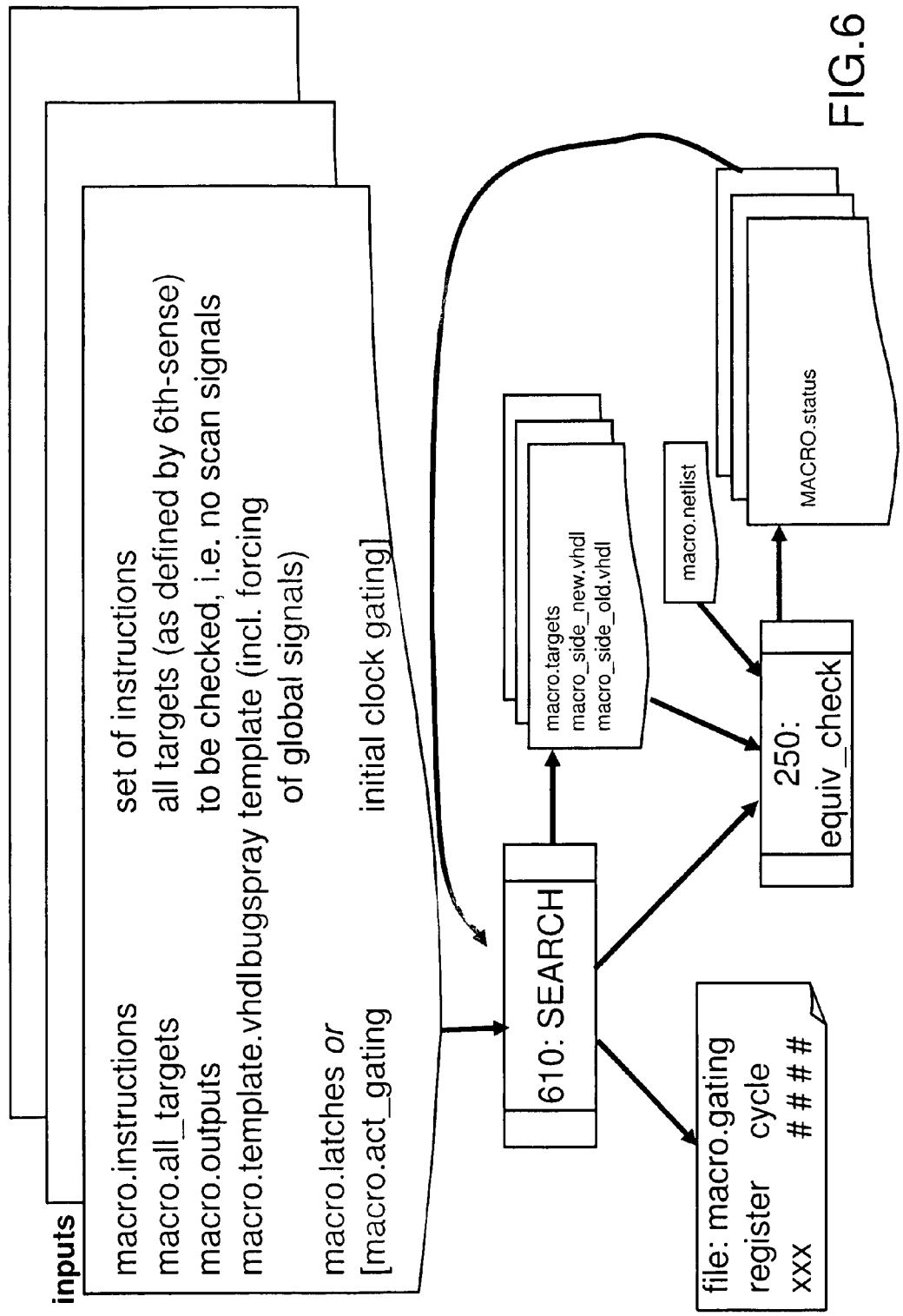
FIG. 6 illustrates in a diagram the basic interaction of tools and the information exchanged when performing a preferred embodiment of the inventive method.

Next, and with reference to FIG. 6, specifically, the input and output objects of the search procedure 610 given in FIG. 7 is described in more detail.

Input to the search tool 610 is a set of input text files comprising the set of instructions to be verified, all output (i.e targets in FV), the output targets to be checked (excluding e.g. scan signals), a template file that includes general setup, and a file containing all latches to be checked or as alternative a table that describes the current gating.

The search tools uses these data to generate a set of input files that are required by the formal verification tool 250 like the targets to be verified. The files also comprise the reference netlist and one override file per macro A and A* to enable the required features within the FV.

The result of the FV is written to a status file that is interpreted by the search tool 610 to setup and start further FV runs until the search algorithm ends. Before the search tools exits it writes a result file combining the results in an activation table, which represents the minimal clock activation scheme as determined by the search algorithm.

The basic idea of the step 250 of FIG. 2, i.e. the verification of internal states, such as clock-gating signal comprises to verify the state of these signals after a certain number of cycles that is dependent on the latency of the outputs. In the case of the clock-gating signals, the clock signals itself or the clock activation signals can be checked against the clock-gated value to ensure that the clock-gating pattern applied does not impact the clock deactivation scheme—i.e. the initial clock activation may not increase clocks gating on certain signals. A more general example is a state-machine that should recover to a certain state after a specific instruction or data has been processed. The important point in this context is to make internal states visible to equivalence checking if they impact the circuit without being directly observable at the standard logic outputs.

A key principle using this scheme of toggling the latch input is that it actually does respect existing functional clock-gating, because values that are stored in a functional clock gated register remain untouched.

The general control flow of the inventive method is described in more detail next and with reference to FIG. 7.

A first loop 710 is entered which covers all instructions, as a block or individually. In this outer loop 710, steps 720 to 795 are performed:

Within said outer loop, a further loop 720 is run for each register: Any register under consideration is clock-gated for all cycles n, verifying if it is required at all. Any register under consideration is clock-gated for all but a single cycle as it is the case for typical pipelined designs.

Next a detailed description of the search algorithm 610 follows. The outer loop 710 of the search algorithm issues searches either for a common clock activation pattern for all instructions defined in the inputs files, or it sets of, i.e. performs an individual search for each instruction defined.

The second loop 720 then iterates over the clock domains as specified. There three possible granularities of the clock domains under consideration for clock gating: 1. all registers combined, 2. each register bank individually, and 3. each single register individually.

The next step 730 sets the clock gating table to clock gate all registers currently under consideration in all cycles. The following verification step 740 stops the analysis of this clock domain, if the outputs are still equivalent. This indicates that the outputs are independent of this clock domain and instruction(s) under consideration. Therefore, they can be clock gated in all cycles.

Then, the algorithm goes back to step 720 to analyse the next register. In case of any inequality of the outputs step 760 is reached. The search algorithm further limits here the verification to those outputs that are unequal. It then iterates a loop variable over all time steps from the trigger event up to the maximal latency of any output still under consideration in step 770. Step 775 sets up a clock gating table that does flip the register in all cycles but the one defined by the loop variable of 770. Applying this clock gating table, equivalence is checked for all outputs still under consideration using FV in step 775.

The loop of 770 stops in step 785 if all active outputs are correct, which indicates that the clock domain under consideration may not be clock gated in the cycle as specified by the loop variable of step 770. The algorithm then continues in step 720 with the next register. The loop 770 does also terminate in step 790 if the maximal value of the loop variable is reached. In this case no clock gating has been found, that generates equivalent outputs with a single cycle activation of a step 795; instead of stopping the search in 795, the algorithm can for example continue with multiple cycle activation. The skilled designer will easily find simple extensions and variations of the specified algorithm.

This search 610 can be done for varying granularities, as e.g. all registers under consideration together, each register bank, or each bit individually. Additionally, the clock gating scheme can be searched for all, a subset of instructions, or for each instruction individually.

Certainly, the search space can be reduced if the actual clock gating scheme is given as a starting point. To realize such a search, clock gating tables are generated by the search algorithm in dependence of the verification results.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

What is claimed is:

1. A computer implemented method for implementing a clock gating scheme for at least one predefined section of logic comprised of a reference circuit design, wherein said reference circuit design is based on a predetermined reference clock gating scheme for said section of logic, characterised by the steps of:
   a) defining a trigger event for at least one predefined section of logic comprised of said reference circuit design, which trigger event defines a cycle in which valid input data arrive at said logic section's input;
   b) determining a latency time describing a propagation delay time for signal propagation between the input of said logic section and each output thereof;
   c) deriving a new clock gating scheme for said logic section, which has a reduced number of clock activations for a predefined set of latches comprised of said circuit section, resulting in a respectively modified circuit design;
   d) calculating, by the computer, relevant equivalence checking time points by adding said latency time to a time corresponding to said trigger event;
   e) performing a formal verification based, sequential equivalence check of the outputs of said reference circuit design and said modified circuit design only at said relevant time points;
   f) responsive to said sequential equivalence check indicating equivalent, defining said modified circuit design, which is associated with an improved clocking gating scheme than that one of said initial design, as a new reference design; and
   g) repeating steps c) to e) until a predefined loop exit criterion is evaluated to TRUE.

2. The method according to claim 1, wherein said trigger event is defined by a specific transition of signals that trigger the processing in the first stage of a pipeline within said section of logic.

3. The method according to claim 2, wherein the source of said signals are a member of the group consisting of:
   a) internal registers; and
   b) external control inputs.

4. The method according to claim 3, wherein said internal registers hold an internal state of a state machine, or delayed control signals, or data.

5. The method according to the claim 3, wherein said external control inputs comprise any one of:
   a) actual data inputs to the unit comprising said logic section, or
   b) control signals in particular an instruction opcode.

6. The method according to claim 1, wherein step c) is implemented by flipping inputs to predetermined registers in predetermined cycles.

7. The method according to claim 6, wherein said flipping of inputs is implemented by inverting at least one of the inputs of said registers.

8. The method according to claim 7, wherein said set of latches is maintained in a clock gating table, storing for each register the clock cycle number telling, when the clock activates the latch.

9. An electronic data processing system for implementing a clock gating scheme for at least one predefined section of logic comprised of a reference circuit design A, wherein said reference circuit design is based on a predetermined reference clock gating scheme for said section of logic, the electronic data process system configured to perform the method of:
  a) defining a trigger event for at least one predefined section of logic comprised of said reference circuit design, which trigger event defines a cycle in which valid input data arrive at said logic section's input;
  b) determining a latency time describing a propagation delay time for signal propagation between the input of said logic section and each output thereof;
  c) deriving a new clock gating scheme for said logic section, which has a reduced number of clock activations for a predefined set of latches comprised of said circuit section, resulting in a respectively modified circuit design;
  d) calculating relevant equivalence checking time points by adding said latency time to a time corresponding to said trigger event;
  e) performing a formal verification based, sequential equivalence check of the outputs of said reference circuit design and said modified circuit design only at said relevant time points;
  f) responsive to said sequential equivalence check indicating equivalent, defining said modified circuit design, which is associated with an improved clocking gating scheme than that one of said initial design, as a new reference design; and
  g) repeating steps c) to e) until a predefined loop exit criterion is evaluated to TRUE.

10. The electronic data processing system according to claim 9, wherein said trigger event is defined by a specific transition of signals that trigger the processing in the first stage of a pipeline within said section of logic.

11. The electronic data processing system according to claim 10, wherein the source of said signals is a member of the group consisting of:
  a) internal registers; and
  b) external control inputs.

12. The electronic data processing system according to claim 11, wherein said internal registers hold an internal state of a state machine, or delayed control signals, or data.

13. A computer program product for implementing a clock gating scheme for at least one predefined section of logic comprised of a reference circuit design, wherein said reference circuit design is based on a predetermined reference clock gating scheme for said section of logic,
  the computer program product comprising a non-transitory computer useable medium including a computer readable program, wherein the computer readable program includes a functional component that when executed on a computer causes the computer to perform a method:
  a) defining a trigger event for at least one predefined section of logic comprised of said reference circuit design, which trigger event defines a cycle in which valid input data arrive at said logic section's input;
  b) determining a latency time describing a propagation delay time for signal propagation between the input of said logic section and each output thereof;
  c) deriving a new clock gating scheme for said logic section, which has a reduced number of clock activations for a predefined set of latches comprised of said circuit section, resulting in a respectively modified circuit design;
  d) calculating relevant equivalence checking time points by adding said latency time to a time corresponding to said trigger event;
  e) performing a formal verification based, sequential equivalence check of the outputs of said reference circuit design and said modified circuit design only at said relevant time points;
  f) responsive to said sequential equivalence check indicating equivalent, defining said modified circuit design, which is associated with an improved clocking gating scheme than that one of said initial design, as a new reference design; and
  g) repeating steps c) to e) until a predefined loop exit criterion is evaluated to TRUE.

14. The method according to claim 13, wherein said trigger event is defined by a specific transition of signals that trigger the processing in the first stage of a pipeline within said section of logic.

15. The method according to claim 12, wherein the source of said signals is a member of the group consisting of:
  a) internal registers; and
  b) external control inputs.

16. The method according to claim 15, wherein said internal registers hold an internal state of a state machine, or delayed control signals, or data.

17. The method according to the claim 15, wherein said external control inputs comprise any one of:
  a) actual data inputs to the unit comprising said logic section, or
  b) control signals in particular an instruction opcode.

18. The method according to claim 14, wherein step c) is implemented by flipping inputs to predetermined registers in predetermined cycles.

19. The method according to claim 18, wherein said flipping of inputs is implemented by inverting at least one of the inputs of said registers.

20. The method according to claim 19, wherein said set of latches is maintained in a clock gating table, storing for each register the clock cycle number telling, when the clock activates the latch.

* * * * *